US012253110B2

(12) United States Patent
Schicke et al.

(10) Patent No.: US 12,253,110 B2
(45) Date of Patent: Mar. 18, 2025

(54) SELF-ALIGNING ROLLER BEARING

(71) Applicant: Schaeffler Technologies AG & Co. KG, Herzogenaurach (DE)

(72) Inventors: Christoph Schicke, Schweinfurt (DE); Andreas Bierlein, Hassfurt (DE); Rainer Schröder, Egenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 82 days.

(21) Appl. No.: 18/018,090

(22) PCT Filed: Jul. 16, 2021

(86) PCT No.: PCT/DE2021/100623
§ 371 (c)(1),
(2) Date: Jan. 26, 2023

(87) PCT Pub. No.: WO2022/022770
PCT Pub. Date: Feb. 3, 2022

(65) Prior Publication Data
US 2023/0287930 A1    Sep. 14, 2023

(30) Foreign Application Priority Data
Jul. 29, 2020   (DE) .......................... 102020119948.1

(51) Int. Cl.
*F16C 23/08*    (2006.01)
*F16C 19/38*    (2006.01)

(52) U.S. Cl.
CPC .............. *F16C 23/08* (2013.01); *F16C 19/38* (2013.01); *F16C 23/086* (2013.01)

(58) Field of Classification Search
CPC .......... F16C 19/28; F16C 19/38; F16C 23/08; F16C 23/082; F16C 23/086; F16C 23/088
See application file for complete search history.

(56) References Cited

U.S. PATENT DOCUMENTS

| 4,227,754 A | * | 10/1980 | Kellstrom | ............... F16C 33/34 384/450 |
| 4,557,613 A | * | 12/1985 | Tallian | .................... F16C 33/36 384/568 |
| 4,828,404 A | | 5/1989 | Takata | |

(Continued)

FOREIGN PATENT DOCUMENTS

| DE | 2334394 | 1/1974 |
| DE | 3904456 | 8/1990 |

(Continued)

*Primary Examiner* — James Pilkington
(74) *Attorney, Agent, or Firm* — Volpe Koenig

(57) ABSTRACT

A reduction in the setting of rollers in a self-aligning roller bearing is provided. The self-aligning roller bearing has inner and outer bearing rings and rollers arranged at least in one roller row. The rollers have a curved lateral surface the direction of the rotation axis and has a radius, and roll over curved raceways of the bearing rings. The raceways are each assigned a groove point around which the curved raceway extends at a radial distance in the direction of the rotation axis. A pressure line intersects the rotation axis at an angle of 90° at a point where these rollers have their largest roller diameter, and the radius of the curved lateral surface is smaller than both radial distances.

16 Claims, 3 Drawing Sheets

(56) References Cited

U.S. PATENT DOCUMENTS

| | | | | |
|---|---|---|---|---|
| 4,929,098 A | * | 5/1990 | Takata | ............... F16C 33/36 |
| | | | | 384/450 |
| 7,918,649 B2 | * | 4/2011 | Nakagawa | ............ F16C 19/505 |
| | | | | 384/558 |

FOREIGN PATENT DOCUMENTS

| | | |
|---|---|---|
| DE | 102008037990 | 2/2010 |
| DE | 102014205220 | 9/2015 |
| EP | 3434918 | 1/2019 |
| FR | 2434954 | 3/1980 |

\* cited by examiner

SELF-ALIGNING ROLLER BEARING

CROSS-REFERENCE TO RELATED APPLICATIONS

This application is the U.S. National Phase of PCT Appln. No. PCT/DE2021/100623, filed Jul. 16, 2021, which claims the benefit of German Patent Appln. No. 102020119948.1, filed Jul. 29, 2020, the entire disclosures of which are incorporated by reference herein.

TECHNICAL FIELD

The disclosure deals with a self-aligning roller bearing, in particular with the rolling behavior of the rollers on the raceways of such a self-aligning roller bearing.

BACKGROUND

Self-aligning roller bearings generally have an inner bearing ring, an outer bearing ring arranged coaxially with the inner bearing ring and rollers arranged in at least one roller row, wherein the rollers of the at least one roller row have a curved lateral surface extending in the direction of the rotation axis of these rollers and has a radius R1, wherein the rollers of this at least one roller row roll over curved raceways provided by different bearing rings, wherein each of these raceways is assigned a groove point P1; P2 around which the curved raceway of the relevant bearing ring extends at a radial distance R2; R3 in the direction of the rotation axis DA2 of the bearing, wherein a pressure line DL intersects the rotation axis DA1 of the rollers of the at least one roller row at a right angle at a point, wherein these rollers have their largest roller diameter, and wherein R1 is smaller than both radii R2, R3.

A self-aligning roller bearing of this type is known from DE 10 2008 037 990 A1.

If such a self-aligning roller bearing is put into operation, the rollers adjust themselves between the raceways of the bearing rings in such a way that the contact area between roller and raceway is in the area of the largest roller diameter, i.e. the so-called pressure ellipse develops there. Since the shape of the outer ring raceway in the direction of the rotation axis of the bearing—viewed geometrically—describes part of a hollow sphere on which the roller or rollers can adjust freely, the contact with the inner ring consequently determines how the rollers adjust themselves in the bearing, wherein the resulting contact angle of the inner ring to the roller corresponds structurally to the pressure angle of the bearing.

In general, it can be said that on the inner ring of self-aligning roller bearings, the highest sliding speeds tend to occur in the edge area of the rolling contact. Depending on the pressure angle and/or the difference between the raceway radii of the inner and outer bearing ring, these higher sliding velocities can occur in the axially inner or axially outer edge areas of the rolling contact and lead to friction losses there, which means that the rollers set and/or cause higher material stresses.

In order to counteract this problem, DE 2 334 394 A1 proposes providing the raceways of the inner and/or outer bearing ring with a non-constant radius. Apart from the fact that running contours that have a small, constant radius can only be manufactured with great effort, such raceway contours offered by the applicant impair the axial positioning of the rollers in the load zone of the bearing and result in undesirable lateral sliding of the rollers.

SUMMARY

Therefore, the object is to provide a self-aligning roller bearing in which contact areas where the highest sliding speeds otherwise occur are relieved in a simple manner.

This object is achieved by a self-aligning roller bearing having one or more of the features specified herein. Advantageous embodiments and further developments are listed below and in the claims.

If the raceway for the rollers of at least one roller row at one of the bearing rings has its associated groove point P1 on the pressure line DL, which gives the raceway radius R2, the raceway for the rollers of at least one roller row on the other bearing ring has its associated groove point P2, which gives the raceway radius R3 on a line L, and if the pressure line DL and the line L have a common intersection point SP1, the radial distance A1 of which from the groove point P2 is smaller than the radial distance A2 from the groove point P1, the raceways on the two bearing rings are arranged tilted relative to one another around the intersection point SP1.

The bearing ring whose raceways are tilted relative to the raceways of the other bearing ring should preferably be the inner bearing ring, because this does not change the manufacturing effort for the outer bearing ring and it is insignificant for production whether the raceways on the inner bearing ring are formed on the groove point P2 lying on the printing line DL or another groove point P2 is formed lying around the line L.

If the manufacturing advantage of the outer bearing ring is dispensed with, which results from a uniform inner contour between the ends of this bearing ring with only one radius, the inner contour of the outer bearing ring can also have two sections, each describing a radius, which merge into one another in the middle of the outer bearing ring.

DETAILED DESCRIPTION

Figure 1:
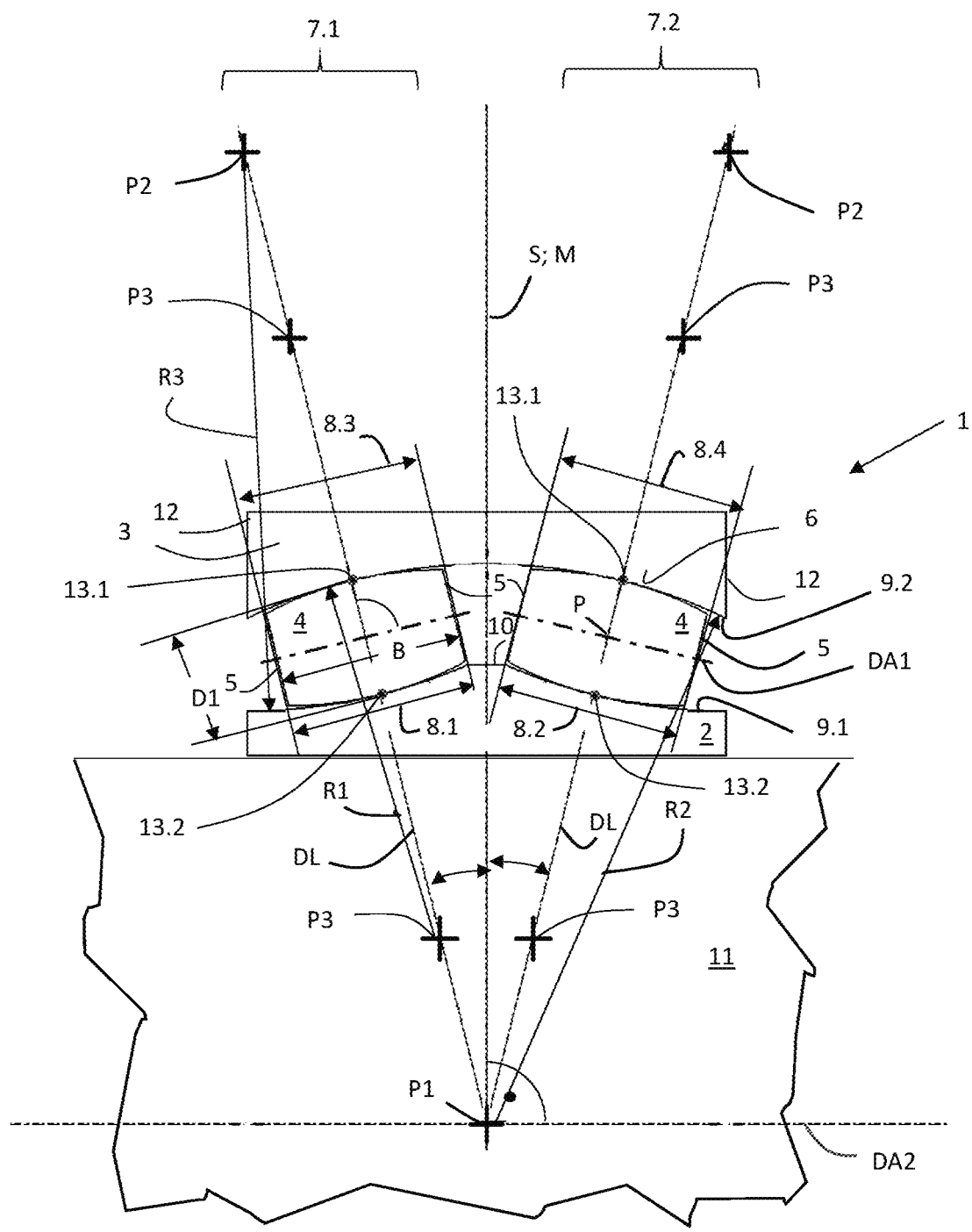
FIG. 1 shows an arrangement according to the prior art.

In FIG. 1, a rolling bearing in the form of a double-row self-aligning roller bearing 1 is shown. This self-aligning roller bearing 1 is essentially formed by an inner bearing ring 2, an outer bearing ring 3 and rollers 4.

Each roller 4 has two end surfaces 5, which maintain a mutual distance along the rotation axis DA1 of the rollers 4, which corresponds to the width B of the roller. The lateral surface 6 of the rollers 4 is curved, wherein the curvature of each lateral surface 6 of each roller 4 describes a radius R1.

As can be seen from the representation according to FIG. 1, the rollers 4 used belong either to a first roller row 7.1 or to a second roller row 7.2. Both roller rows 7.1, 7.2 maintain a mutual distance along the rotation axis DA2 of the bearing.

Each of the two bearing rings 2, 3 is provided with at least one raceway 8.1, 8.2; 8.3, 8.4 A raceway 8.1, 8.2; 8.3, 8.4 in the sense of this application is understood to mean an annular surface which lies on the radially outer contour 9.1 in the case of an inner bearing ring 2 and on its radially inner contour 9.2 in the case of an outer bearing ring 3, has an extension in each case in the direction of the rotation axis DA2 of the bearing and over which the rollers 4 provided between the two bearing rings 2, 3 roll when the bearing is mounted.

Since the bearing shown in FIG. 1 is a double-row self-aligning roller bearing 1 on which the rollers 4 are combined in a first and second roller row 7.1, 7.2, each of the two bearing rings 2, 3 also has two raceways 8.1, 8.2; 8.3, 8.4. This becomes particularly clear for the inner bearing ring 2, which has on its outer contour 9.1 an elevation 10 that separates the two raceways 8.1, 8.2 and extends in the direction of the outer bearing ring 3. In order to make it possible to mount the double-row self-aligning roller bearing and to ensure that the rotation axis D2 of the bearing or a shaft 11 connected to the inner bearing ring 2 can be tilted relative to the outer bearing ring 3, the two raceways 8.3, 8.4 form a common raceway, which takes up the entire inner contour 9.2 of the outer bearing ring 3.

Just like the curved lateral surfaces 6 of the rollers 4 arranged between the two bearing rings 2, 3, each of the raceways 8.1, 8.2; 8.3, 8.4 is also curved. The common raceway 8.3, 8.4, which extends fully along the inner contour 9.2 of the outer bearing ring 3 between its axial ends 12, has a uniform curvature with a radius R2, which is slightly larger than the radius R1 of the respective lateral surfaces 6 of the rollers 4. Consequently, the common raceway 8.3, 8.4 provides a concave cavity in relation to the longitudinal extension of the rollers 4. The inner bearing ring 2 is similar. Due to the X arrangement of the rollers 4 between the bearing rings 2, 3, however, there are two raceways 8.1, 8.2, which are axially separated from one another by an elevation 10, of which each of these raceways 8.1, 8.2 has a uniform curvature with a radius R3, which is also slightly larger than the radius R1 of the respective lateral surfaces 6 of the rollers 4. Consequently, each of the two separate raceways 8.1, 8.2 on the inner bearing ring 2 also provides a concave cavity in relation to the longitudinal extension of the rollers 4. Even if the radii R2, R3 shown in the representation according to FIG. 1 are of an equal size, these radii R2, R3 can also be of a different size in order for example to guide the rollers 4 there through a smaller osculation, for example between the rollers 4 and the respective raceways 8.1, 8.2 on the inner bearing ring, compared to a larger osculation on the outer bearing ring 3. Here, the quotient between the respective running radius R2; R3 and the radius 1 of the lateral surfaces of the rollers 4 times 100% is regarded as being the osculation, so that when comparing large and small osculations, this quotient is only slightly above 100% with a small osculation and with a large osculation, this quotient is larger, with percentage further above 100%.

If a double-row self-aligning roller bearing 1 is mounted, the lateral surfaces 6 of the rollers 4 and the respective raceways 8.1, 8.2; 8.3, 8.4 form contact points 13.n. In the case of a conventionally designed self-aligning roller bearing 1 as shown in FIG. 1, an intended connection line, which runs from the inner and outer bearing ring 2, 3 through the respective contact points 13.1, 13.2 between the lateral surfaces 6 of the respective rollers 4 and the respective raceways 8.1, 8.2; 8.3, 8.4, intersects the rotation axes DA1 of the rollers 4 at a right angle, which is identified as angle β. This connecting line, which at the same time forms the so-called pressure line DL, runs at a so-called pressure angle α, which is related to a perpendicular S intersecting the rotation axis DA2 of the bearing at a right angle. As a rule, as shown in FIG. 1, in the case of double-row self-aligning roller bearings 1, the contact angles α of both roller rows 7.1, 7.2 are the same.

In connection with this application, self-aligning roller bearings 1, the contact angles α of which are the same for both roller rows 7.1, 7.2, are generally referred to as symmetrical self-aligning roller bearings 1. However, double-row self-aligning roller bearings are also known for improved dissipation of axial loads, in which the contact angles α of the two roller rows 7.1, 7.2 are of different sizes. Such bearings are referred to as asymmetric self-aligning roller bearings.

Structurally, this means that at least in the case of symmetrical self-aligning roller bearings 1 of the type shown in FIG. 1, the radii R2, R3 of the raceways 8.1, 8.2; 8.3, 8.4 have their respective groove points P1, P2 on the pressure line DL. This means that with a mounted self-aligning roller bearing 1, in which the rollers 4 are arranged between the two bearing rings 2, 3, their curved lateral surfaces 6 describing a radius R1 only have a point of contact 13.1, 13.2 with the respective raceways 8.1, 8.3; 8.2, 8.4 if—as is usual—the imaginary groove point P3 of the radius R1 for the lateral surfaces 6 also lies on the pressure line DL.

If, however, symmetrical self-aligning roller bearings 1 are formed as shown in FIG. 1, it cannot be ruled out that the rollers 4 will set during the operation of such a bearing, as already stated at the outset.

Figure 2:
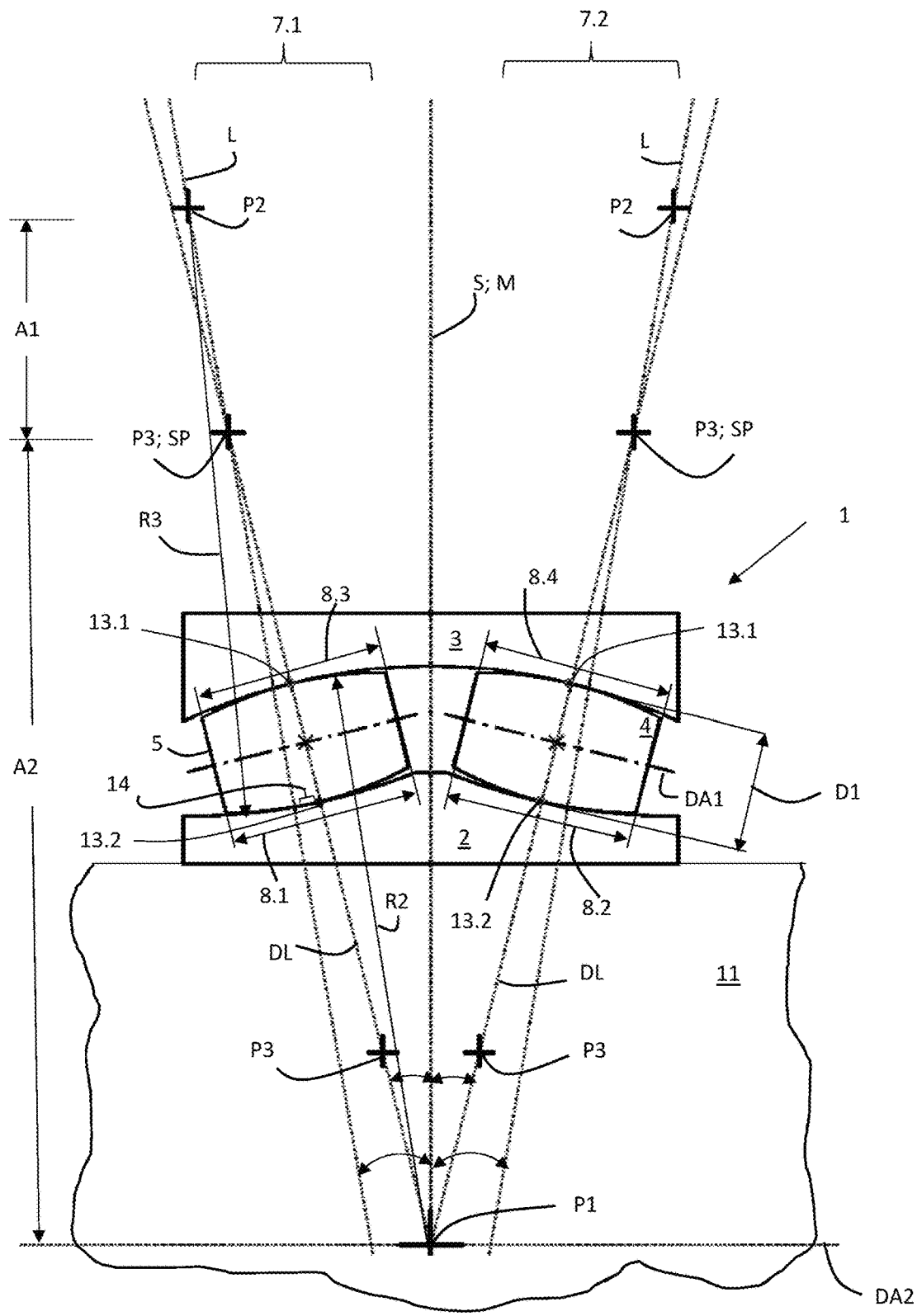
FIG. 2 shows an arrangement according to the disclosure.

In order to reduce or completely rule out setting of the rollers 4 during operation, only the structural conditions for one of the two bearing rings 2, 3 are changed, based on an arrangement corresponding to the prior art. Such an embodiment described and is shown in FIG. 2.

Here, the outer bearing ring 3 forms the unchanged bearing ring according to the explanations in the last paragraph, because there too, the groove point P1 for the radius R2 of the common raceway 8.3, 8.4 is also on the pressure line DL, specifically where this intersects the rotation axis DA2 of the bearing. Consequently, the points of contact 13.1 of the rollers 4 of the two roller rows 7.1, 7.2 with the common raceway 8.3, 8.4 are also located where the rollers 4 have their largest roller diameter D1.

Deviating from this are the groove points P2 of the radii R3 of the raceways 8.1, 8.2 of the inner bearing ring 2 on a line L, which in each case includes an angle β to the vertical S and which forms an intersection SP with the pressure line DL.

This angle β is a function of the pressure angle α and the corresponding radii R2, R3 of the raceways 8.1, 8.2 or 8.2, 8.4 involved. Since in the embodiment shown in FIG. 2 the radius R2 of the common raceways 8.3, 8.4 of the outer bearing ring 3 is smaller than the radius R3 of the raceways 8.1, 8.2 of the inner bearing ring 2, it follows, according to the relationship $$\beta=\arcsin(R2/R3*\sin(\alpha)),$$

that the angle β is smaller than the pressure angle α.

Due to the difference between the two angles α, β and the fact that, in relation to the rotation axis DA2 of the bearing, the groove points P2 of the raceways 8.1, 8.2 on the inner bearing ring 2 maintain a greater radial distance on the outer bearing ring 3 compared to the groove point P3 of the common raceway 8.3, 8.4, the radial distance A1 of the intersection point SP from the respective groove point P2 is smaller than the radial distance A2 of the intersection point SP from the groove point P1.

This angular offset between the groove points P2, P3 of the respective raceways 8.1, 8.2; 8.3, 8.4 does not result in the contact points 13.2 between the rollers 4 and the respective raceways 8.1, 8.2 changing, i.e. shifting along the raceways 8.1, 8.2. Rather, despite the position of the groove points P2 for the raceways 8.1, 8.2 on the line L running at the angle β, the contact points 13.2 between the rollers 4 and the raceways 8.1, 8.2 of the inner bearing ring 2 are basically where the rollers 4 have their largest diameter D1. However, due to the tilting of the raceways 8.1, 8.2 of the inner bearing ring 2 due to their groove points P2 on the lines L, the contact conditions between the rollers 4 and the respective raceways 8.1, 8.2 change, with the result that the pressure ellipses, which generally change under load to form the respective contact points 13.2, expand a little more axially outwards. This axial extension is indicated by reference number 14 for the roller row 7.1. This tilting of the raceways 8.1, 8.2 has the further consequence that, in relation to the respective contact points 13,2, the sections of the raceways 8.1, 8.2 that adjoin it axially inwards in FIG. 2 have a flatter rise compared to an embodiment according to FIG. 1 of the respective curvature. This flatter increase in the respective curvature of the raceways 8.1, 8.2 of the inner bearing ring 2 axially inwards then reduces higher sliding speeds between the respective raceways 8.1, 8.2 and the rollers 4 there due to the associated smaller circumferences of the raceways 8.1, 8.2.

Figure 3:
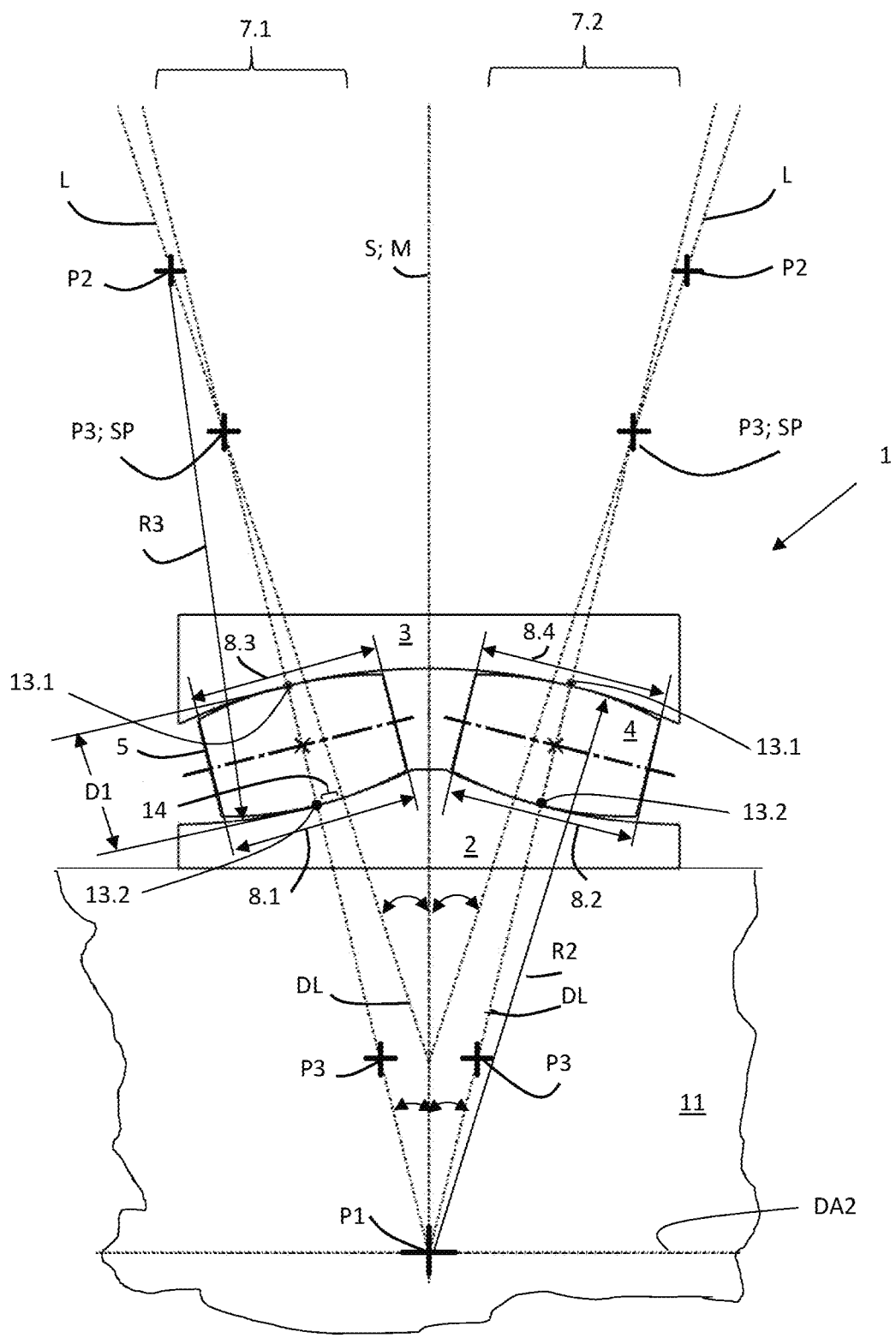
FIG. 3 shows a further arrangement according to the disclosure.

FIG. 3 shows a further embodiment, which differs from the embodiment according to FIG. 2 in that the radius R2 of the common raceway 8.3, 8.4 on the outer bearing ring 3 is greater than the radius R3 of the respective raceways 8.1, 8.2 on inner bearing ring 2 and that therefore, according to the relationship $$\beta=\arcsin(R2/R3*\sin(\alpha)),$$

the angle β, under which the line L runs, is larger than the pressure angle α. Because the angle β is larger than the pressure angle α, the resulting pressure ellipses expand axially inwards when the bearing is loaded, starting from the contact points 13.2. This turning area axially inwards is indicated in FIG. 3 by the reference number 14 in connection with the left-hand roller row 7.1. The contact conditions changed in this way then lead to the conditions according to FIG. 2 reversing, i.e. the curved areas of the raceways 8.1, 8.2 adjoining the contact points 13.2 axially inwardly increase more in relation to raceways 8.1, 8.2 according to FIG. 1, while the areas adjoining axially outwardly increase less. This design has advantages in the case of a strong axial load on the bearing.

Both in the exemplary embodiment according to FIG. 2 and in the exemplary embodiment according to FIG. 3, the surface roughnesses a1, b1 of the various raceways 8.1, 8.2; 8.3, 8.4 can differ from one another. For example, following correspondingly finer mechanical processing of the raceways 8.1, 8.2 of the inner bearing ring 2, their surface roughness a1 can be lower than the surface roughness b1 of the common raceway 8.3, 8.4 of the outer bearing ring 3. In addition to the pure surface roughness, which is given to the respective raceways 8 n solely by mechanical processing and/or a coating, there are also so-called operational roughnesses a.2 on the raceways 8.2, 8.3 of the outer bearing ring 3 or operational roughness b.2 on the raceways 8.1, 8.2 of the inner bearing ring 2 also influence the rolling behavior of rollers 4 between the raceways 8.1, 8.2; 8.3, 8.4 Within the meaning of this application, so-called operating roughnesses a.2 and b.2 are understood to mean influencing variables which only become apparent during operation of the bearing and can sometimes also interact with the respective surface roughnesses a.1, b.1. Only the speed of the bearing and the viscosity of the lubricant used are mentioned as examples of operational roughness. Since the operating roughnesses a2, b2 that occur on the raceways 8.1 and 8.2 of the inner bearing ring 2 can differ in size from those of the raceways 8.3, 8.4 of the outer bearing ring 3 during operation of the bearing, it is advantageous to take into account the respective roughnesses a1, b2 or a1, b2 of the different raceways 8.1, 8.2; 8.3, 8.4 when designing the bearing or the angle β. This succeeds if, based on the roughnesses a.1 and/or a2 or b1 and/or b2, so-called roughness factors f1, f2 are set up for each of the raceways 8.1, 8.2 or 8.3, 8.4 involved.

A formula that takes into account the roughness factors f1, f2 of the different raceways 8.1, 8.2; 8.3, 8.4 when designing the angle β can be taken from the following relationship:

$$\beta=\arcsin(f1/f2*R2/R3*\sin(\alpha)),$$

Where here, too, R2 is the radius of the common raceway 8.3, 8.4 in the outer bearing ring 3, R3 is the radii of the raceways 8.1, 8.2 in the inner bearing ring 2, f1 is the roughness factor on the common-raceway 8.3, 8.4 of the outer bearing ring 3 and f2 is the roughness factor on the raceways 8.1, 8.2 of the inner bearing ring 2.

LIST OF REFERENCE NUMERALS

1 Self-aligning roller bearing
2 Inner bearing ring
3 Outer bearing ring
4 Roller
5 End surface
6 Lateral surface
7.1, 7.2 First or second roller row
8.n Raceway
9.1, 9.2 Inner or outer contour
10 Elevation
11 Shaft
12 Ends
13.n Contact point
14 Extension

The invention claimed is:
1. A self-aligning roller bearing, comprising:
an inner bearing ring;
an outer bearing ring, which is arranged coaxially with respect to the inner bearing ring;
rollers arranged in at least one roller row, the rollers of the at least one roller row each have a curved lateral surface which extends in a direction of a rotation axis of said rollers and has a radius;
the rollers of said at least one roller row roll over outer and inner curved raceways provided by the inner and outer bearing rings, respectively;
each of said raceways is assigned a respective groove point corresponding to a radial distance around which the curved raceway of the respective inner or outer bearing ring extends in a direction of the rotation axis of the bearing;
a pressure line intersects the rotation axis of the rollers of the at least one roller row at an angle of 90° at a point, where the rollers have a largest roller diameter, and the radius of the curved lateral surfaces is smaller than each of the respective outer and inner raceway radial distances;
the inner raceway for the rollers of the outer bearing ring has the groove point on the pressure line such that an inner raceway radius and the pressure line coincide;

the outer raceway for the rollers of the inner bearing ring has the groove point on a line such that an outer raceway radius and the line coincide; and the pressure line and the line have a common intersection point, the line extends between the common intersection point and the groove point of the inner bearing ring, and a radial distance of the common intersection point from the groove point of the inner bearing ring is less than a radial distance from the groove point of the outer bearing ring;

wherein the common intersection point simultaneously forms a center point of the radius of the curved lateral surfaces of the rollers of the at least one roller row.

2. The self-aligning roller bearing according to claim 1, wherein the outer raceway radial distance differs from the inner raceway radial distance.

3. The self-aligning roller bearing according to claim 1, wherein a course of the pressure line and line are in an angular relationship defined by $$\beta = \arcsin(R2/R3 * \sin(\alpha)),$$

wherein, in relation to a perpendicular running through the groove point of the inner raceway of the outer bearing ring and standing at a right angle to the rotation axis of the bearing, the angle $\alpha$ stands for the pressure angle of the pressure line and the angle $\beta$ stands for an angle of the line and wherein R2 is the inner raceway radial distance on the outer bearing ring and R3 is the outer raceway radial distance on the inner bearing ring.

4. The self-aligning roller bearing according to claim 1, wherein at least one of a surface roughness or an operational roughness of the outer raceway of the inner bearing ring differs from at least one of a surface roughness or operational roughness of the inner raceway of the outer bearing ring.

5. The self-aligning roller bearing according to claim 1, wherein the self-aligning roller bearing is a double-row self-aligning roller bearing and the at least one roller row includes a first roller row and a second roller row.

6. The self-aligning roller bearing according to claim 5, wherein the first roller row and second roller row together with the rollers and the raceways in the inner and outer bearing rings are mirror-symmetrical with respect to a center line perpendicular to the rotation axis.

7. The self-aligning roller bearing according to claim 5, wherein the pressure angles of the first and second roller rows are of different magnitude.

8. A self-aligning roller bearing, comprising:
an inner bearing ring;
an outer bearing ring arranged coaxially with respect to the inner bearing ring;
rollers arranged in a roller row, the rollers each have a curved lateral surface which extends in a direction of a rotation axis of said rollers and has a radius;
the rollers of said roller row roll over outer and inner curved raceways provided by the inner and outer bearing rings, respectively;
each of said raceways is assigned a respective groove point corresponding to a radial distance around which the curved raceway of the respective inner or outer bearing ring extends in a direction of the rotation axis of the bearing;
a pressure line intersects the rotation axis of the rollers of the roller row at an angle of 90°, where the rollers have a largest roller diameter, and the radius of the curved lateral surfaces is smaller than each of the respective outer and inner raceway radial distances;

the inner raceway for the rollers of the outer bearing ring has the groove point on the pressure line such that an inner raceway radius and the pressure line coincide;

the outer raceway for the rollers of the inner bearing ring has the groove point on a line such that an outer raceway radius and the line coincide; and the pressure line and the line have a common intersection point, the line extends between the common intersection point and the groove point of the inner bearing ring, and a radial distance of the common intersection point from the groove point of the inner bearing ring is less than a radial distance from the groove point of the outer bearing ring;

wherein a course of the pressure line and line are in an angular relationship defined by:

$$\beta = \arcsin(R2/R3 * \sin(\alpha)),$$

wherein, in relation to a perpendicular running through the groove point of the inner raceway of the outer bearing ring and standing at a right angle to the rotation axis of the bearing, the angle $\alpha$ stands for the pressure angle of the pressure line and the angle $\beta$ stands for an angle of the line and wherein R2 is the inner raceway radial distance on the outer bearing ring and R3 is the outer raceway radial distance on the inner bearing ring.

9. The self-aligning roller bearing according to claim 8, wherein the common intersection point simultaneously forms a center point of the radius of the curved lateral surfaces of the rollers of the roller row.

10. The self-aligning roller bearing according to claim 8, wherein the outer raceway radial distance differs from the inner raceway radial distance.

11. The self-aligning roller bearing according to claim 8, wherein at least one of a surface roughness or an operational roughness of the outer raceway of the inner bearing ring differs from at least one of a surface roughness or operational roughness of the inner raceway of the outer bearing ring.

12. The self-aligning roller bearing according to claim 8, wherein the self-aligning roller bearing is a double-row self-aligning roller bearing and includes a second roller row located in second respective raceways in the inner and outer rings.

13. The self-aligning roller bearing according to claim 12, wherein the second roller row together with the rollers and the second raceways in the inner and outer bearing rings are mirror-symmetrical with respect to a center line perpendicular to the rotation axis to the roller row and the rollers and the raceways in the inner and outer bearing rings.

14. The self-aligning roller bearing according to claim 12, wherein the pressure angles of the first and second roller rows are of different magnitude.

15. A self-aligning roller bearing, comprising:
an inner bearing ring;
an outer bearing ring, which is arranged coaxially with respect to the inner bearing ring;
rollers arranged in at least one roller row, the rollers of the at least one roller row each have a curved lateral surface which extends in a direction of a rotation axis of said rollers and has a radius;
the rollers of said at least one roller row roll over outer and inner curved raceways provided by the inner and outer bearing rings, respectively;
each of said raceways is assigned a respective groove point corresponding to a radial distance around which the curved raceway of the respective inner or outer bearing ring extends in a direction of the rotation axis of the bearing;

a pressure line intersects the rotation axis of the rollers of the at least one roller row at an angle of 90° at a point, where the rollers have a largest roller diameter, and the radius of the curved lateral surfaces is smaller than each of the respective outer and inner raceway radial distances;

the inner raceway for the rollers of the outer bearing ring has the groove point on the pressure line such that an inner raceway radius and the pressure line coincide;

the outer raceway for the rollers of the inner bearing ring has the groove point on a line such that an outer raceway radius and the line coincide; and the pressure line and the line have a common intersection point, the line extends between the common intersection point and the groove point of the inner bearing ring, and a radial distance of the common intersection point from the groove point of the inner bearing ring is less than a radial distance from the groove point of the outer bearing ring;

wherein the self-aligning roller bearing is a double-row self-aligning roller bearing and the at least one roller row includes a first roller row and a second roller row, the first roller row and second roller row together with the rollers and the raceways in the inner and outer bearing rings are mirror-symmetrical with respect to a center line perpendicular to the rotation axis.

16. The self-aligning roller bearing according to claim 15, wherein the pressure angles of the first and second roller rows are of different magnitude.

* * * * *